(12) United States Patent
Zhang et al.

(10) Patent No.: US 11,368,904 B2
(45) Date of Patent: Jun. 21, 2022

(54) NETWORK SLICE SELECTION METHOD AND APPARATUS

(71) Applicant: HUAWEI TECHNOLOGIES CO., LTD., Guangdong (CN)

(72) Inventors: Chunlei Zhang, Shanghai (CN); Guangchao Zhou, Shanghai (CN); Heng Chen, Shanghai (CN); Zhiyong Zhou, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/426,957

(22) Filed: May 30, 2019

(65) Prior Publication Data

US 2019/0281541 A1    Sep. 12, 2019

Related U.S. Application Data

(63) Continuation of application No. PCT/CN2018/076979, filed on Feb. 22, 2018.

(30) Foreign Application Priority Data

Feb. 27, 2017    (CN) .......................... 201710108379.1

(51) Int. Cl.
*H04W 4/00*        (2018.01)
*H04W 48/00*       (2009.01)
(Continued)

(52) U.S. Cl.
CPC ......... *H04W 48/17* (2013.01); *H04L 61/6054* (2013.01); *H04W 8/24* (2013.01);
(Continued)

(58) Field of Classification Search
None
See application file for complete search history.

(56) References Cited

U.S. PATENT DOCUMENTS

2015/0113115 A1    4/2015  Resch
2017/0054595 A1    2/2017  Zhang et al.
(Continued)

FOREIGN PATENT DOCUMENTS

CN    105791355 A    7/2016
CN    106060900 A    10/2016
(Continued)

OTHER PUBLICATIONS

R3-160755 LG Electronics Inc.,"Consideration on network slice selection",3GPP TSG-RAN WG3 Meeting # 91 bis, Bangalore, India, Apr. 11-15, 2016,total 3 pages.
(Continued)

*Primary Examiner* — Clemence S Han
(74) *Attorney, Agent, or Firm* — Womble Bond Dickinson (US) LLP

(57) ABSTRACT

This application discloses a network slice selection method and apparatus, to resolve a prior-art problem of large transmission load on a network side. The method performed by a core network device includes: receiving a first request message sent by a terminal device, where the first request message is used to request to allocate, to the terminal device, a network slice that provides a business service; sending a query message to a SSF, where the query message carries user information of the terminal device, and is used to query for a network slice that is capable of providing a business service for the terminal device; and after receiving slice information of the network slice that is capable of providing the business service required by the terminal device and that is determined based on the user information, forwarding the first request message to the network slice corresponding to the slice information.

20 Claims, 10 Drawing Sheets

(51) Int. Cl.
H04W 76/11 (2018.01)
H04L 101/654 (2022.01)
H04W 8/24 (2009.01)
H04W 48/14 (2009.01)
H04W 60/00 (2009.01)
H04W 36/00 (2009.01)
H04W 48/18 (2009.01)

(52) U.S. Cl.
CPC ........... *H04W 36/00* (2013.01); *H04W 48/14* (2013.01); *H04W 48/18* (2013.01); *H04W 60/00* (2013.01); *H04W 76/11* (2018.02)

(56) References Cited

U.S. PATENT DOCUMENTS

| | | | |
|---|---|---|---|
| 2017/0142591 A1* | 5/2017 | Vrzic | H04L 47/2408 |
| 2017/0332421 A1* | 11/2017 | Sternberg | H04W 12/0609 |
| 2017/0339609 A1* | 11/2017 | Youn | H04W 76/11 |
| 2017/0367036 A1* | 12/2017 | Chen | H04L 43/08 |
| 2018/0035399 A1* | 2/2018 | Xu | H04W 8/06 |
| 2018/0176858 A1* | 6/2018 | Wang | H04W 76/12 |
| 2018/0352501 A1* | 12/2018 | Zhang | H04W 48/14 |
| 2019/0021047 A1 | 1/2019 | Zong | |
| 2019/0158360 A1* | 5/2019 | Xu | H04L 41/12 |
| 2019/0313473 A1* | 10/2019 | Kim | H04W 76/25 |
| 2019/0387393 A1* | 12/2019 | Xu | H04W 36/0016 |

FOREIGN PATENT DOCUMENTS

| | | |
|---|---|---|
| CN | 106210042 A | 12/2016 |
| CN | 106341832 A | 1/2017 |
| CN | 106375987 A | 2/2017 |
| CN | 106412905 A | 2/2017 |
| CN | 107347205 A | 11/2017 |
| CN | 108513290 B | 7/2020 |
| JP | 2016201602 A | 12/2016 |
| WO | 2016113654 A1 | 7/2016 |
| WO | 2016127926 A1 | 8/2016 |
| WO | 2017012402 A1 | 1/2017 |
| WO | 2017025149 A1 | 2/2017 |

OTHER PUBLICATIONS

3GPP TR 23.799 V0.7.0 (Aug. 2016),3rd Generation Partnership Project;Technical Specification Group Services and System Aspects;Study on Architecture for Next Generation System(Release 14),total 322 pages.
S2-164512 Huawei et al."Network Slice selection in roaming scenario",SA WG2 Meeting #116BIS,Aug. 29-Sep. 2, 2016, Sanya, China,total 7 pages.
3GPP TR 33.899 V0.5.0 (Oct. 2016);3rd Generation Partnership Project;Technical Specification Group Services and System Aspects;Study on the security aspects of the next generation system(Release 14);total 244 pages.
NGMN Alliance NGMN 5G White Paper NGMN 5G White Paper. Feb. 17, 2015. pp. 1-125.
3GPP TS 23.502 V0.2 0 (Feb. 2017),3rd Generation Partnership Project;Technical Specification Group Services and System Aspects;Procedures for the 5G System;Stage 2(Release 15),total 71 pages.
3GPP TS 23.501 V0.2 0 (Jan. 2017),3rd Generation Partnership Project;Technical Specification Group Services and System Aspects;System Architecture for the 5G System;Stage 2(Release 15),total 69 pages.
Huanguo Zhang et al.,"Survey on cyberspace security",Scientia Sinica(Informationis),2016,with an English abstract, total 40 pages.
Ericsson,"Solution for selection of a network slice instance",SA WG2 Meeting #114 S2-161480,Apr. 11-15, 2016, Sophia Antipolis, total 4 pages.
3GPP TR 23.799 V0.7.0 (Aug. 2016);3rd Generation Partnership Project;Technical Specification Group Services and System Aspects;Study on Architecture for Next Generation System(Release 14),total 323 pages.
3GPP TR 23.799 V2.0.0 (Nov. 2016);3rd Generation Partnership Project;Technical Specification Group Services and System Aspects;Study on Architecture for Next Generation System(Release 14),total 523 pages.

* cited by examiner

NETWORK SLICE SELECTION METHOD AND APPARATUS

CROSS-REFERENCE TO RELATED APPLICATIONS

This application is a continuation of International Application No. PCT/CN2018/076979, filed on Feb. 22, 2018, which claims priority to Chinese Patent Application No. 201710108379.1, filed on Feb. 27, 2017. The disclosures of the aforementioned applications are hereby incorporated by reference in their entireties.

TECHNICAL FIELD

This application relates to the field of communications technologies, and in particular, to a network slice selection method and apparatus.

BACKGROUND

As network communication connection capability is constantly enhanced, digital transformation is performed nearly in all industries to improve work and production efficiency. Examples of digital transformation may be found in a virtual meeting or a virtual classroom based on a holography technology, remote real-time control of a large machine in a dangerous environment or remote surgery, mobile broadband for a vehicle moving at a high speed, ubiquitous Internet of Things, a ubiquitous mobile video, and real-time industrial control. Digital transformation imposes increasingly high and diverse requirements on the connection capability, and different applications have quite different requirements for a network in aspects such as speed, performance, security, reliability, and latency. Therefore, a conventional single network increasingly cannot meet requirements of communication services having different connection capabilities. If a conventional dedicated network is used, problems of a high cost and a long time to market (TTM) exist. A concept of a network slice is proposed in a fifth generation (5G) mobile communications technology system. One network slice meets a connection communication service requirement of one type of application or one application, and the entire 5G system includes a large quantity of network slices that meet the requirements of different connection capabilities.

To meet the requirements of different scenarios in all industries, an operator needs to provide connection communication services having different functions and different quality of service (QoS). To reduce complexity in technical implementation, shorten a time to market for a service, and enhance an innovation capability, a virtualization technology is used to slice an entire network resource, so that communication services having different connection capabilities are deployed on different network slices, and decoupling is technically implemented between the communication services having different connection capabilities.

For a 5G network slice architecture, when user equipment (UE) is connected to a network, a network slice needs to be selected. Currently, during network slice selection, an independent logical network element slice selection function entity (SSF) is usually added on a network side, and is responsible for selecting, for the UE, a network slice accessible to the UE. A radio access network node (RAN Node) requests, based on a request from the UE, the SSF to allocate a network slice to the UE, so that after receiving the request from the RAN node, the SSF selects a network slice for the UE. It can be learned from the foregoing that the SSF needs to perform network connection to a plurality of RAN nodes, thereby increasing signaling transmission load on the network side.

SUMMARY

This application provides a network slice selection method and apparatus, to resolve a prior-art problem of large transmission load on a network side.

According to a first aspect, an embodiment of this application provides a network slice selection method, including:

receiving, by a core network device, a first request message sent by a terminal device, where the first request message is used to request to allocate, to the terminal device, a network slice that provides a business service; sending, by the core network device, a query message to a slice selection function entity (SSF), where the query message carries user information of the terminal device, and is used to query for a network slice that is capable of providing a business service for the terminal device; and after receiving slice information, sent by the SSF, of the network slice that is capable of providing the business service required by the terminal device and that is determined based on the user information, forwarding, by the core network device, the first request message to the network slice corresponding to the slice information, so that the network slice corresponding to the slice information provides the business service for the terminal device. It can be learned from the foregoing manner that the SSF no longer needs to connect to a plurality of access network devices. This reduces signaling transmission between the SSF and an access network device, and reduces occupation of transmission resources.

In one embodiment, the user information of the terminal device includes at least one of the following information:

an international mobile subscriber identity (IMSI) of the terminal device;

a service type of the terminal device; and an international mobile equipment identity (IMEI) of the terminal device.

In the foregoing embodiment, the query message carries the user information, so that the SSF selects a network slice for a user based on the user information.

In one embodiment, the method further includes:

after forwarding the first request message to the network slice corresponding to the slice information, receiving, by the core network device, identification information, sent by the network slice, of the network slice; and sending, by the core network device, the identification information of the network slice to the terminal device.

In the foregoing embodiment, the identification information of the network slice is sent by the network slice to the core network device, and forwarded by the core network device to the terminal device, so that the terminal device learns of the network slice suitable for the terminal device, and directly requests, in a next attach request or a next service request, to connect to the network slice. This reduces signaling transmission between the core network device and the SSF, and saves transmission resources.

In one embodiment, after the sending, by the core network device, the identification information of the network slice to the terminal device, the method further includes:

receiving, by the core network device, a second request message sent by the terminal device, where the second request message carries the identification information of the network slice; and forwarding, by the core network device, the second request message to the network slice corresponding to the identification information of the network slice, so that the network slice corresponding to the identification information provides the business service for the terminal device.

In the foregoing embodiment, the terminal device receives the identification information of the network slice sent by the core network device, so that the terminal device learns of the network slice suitable for the terminal device, and directly requests, in a next attach request or a next service request, to connect to the network slice. This reduces signaling transmission between the core network device and the SSF, and saves transmission resources.

In one embodiment, the slice information includes at least one of the following information:

the identification information of the network slice, a type of the network slice, and address information of the network slice.

In one embodiment, the method may further include:

after forwarding the first request message to the network slice corresponding to the slice information, receiving, by the core network device, identification information, sent by the network slice, of the network slice; and storing, by the core network device, a correspondence between the terminal device and the identification information of the network slice.

In the foregoing embodiment, after receiving the identification information, sent by the network slice, of the network slice, the core network device can determine the network slice matching the terminal device, and therefore can store the correspondence between the terminal device and the identification information of the network slice. Subsequently, when a request is received from the terminal device again, the network slice can be selected for the terminal device based on the correspondence. This reduces signaling transmission between the core network device and the SSF, and reduces occupation of transmission resources.

In one embodiment, the method may further include:

receiving, by the core network device, a third request message sent by the terminal device, where the third request message is used to request to allocate, to the terminal device, a network slice that provides a business service; and determining, by the core network device based on the correspondence, the network slice corresponding to the service required by the terminal device, and forwarding the third request message to the determined network slice, so that the terminal device attaches to the determined network slice.

In the foregoing embodiment, after receiving the third request message sent by the terminal device and determining that the correspondence stores a slice identifier of the network slice corresponding to the terminal device, the core network device no longer needs to query the SSF for the network slice matching the terminal device. This reduces signaling transmission between the core network device and the SSF, and reduces occupation of transmission resources.

According to a second aspect, an embodiment of this application provides a network slice selection method, including:

receiving, by a slice selection function entity (SSF), a query message sent by a core network device, where the query message carries user information of a terminal device, and is used to query for a network slice that provides a business service for the terminal device; and determining, by the SSF based on a mapping relationship, slice information of a network slice corresponding to the user information of the terminal device, and sending the slice information to the core network device, where the mapping relationship is used to describe a correspondence between user information of different terminal devices and slice information of different network slices.

It can be learned from the foregoing embodiment that the SSF only needs to connect to the core network device and no longer needs to connect to a plurality of access network devices. This reduces signaling transmission between the SSF and an access network device, and reduces occupation of transmission resources.

In one embodiment, the user information of the terminal device includes at least one of the following information:

an international mobile subscriber identity (IMSI) of the terminal device;

a service type of the terminal device; and an international mobile equipment identity (IMEI) of the terminal device.

Based on a same inventive concept as the foregoing method embodiments, according to a third aspect, an embodiment of this application provides a network slice selection apparatus, including:

a receiving unit, configured to receive a first request message sent by a terminal device, where the first request message is used to request to allocate, to the terminal device, a network slice that provides a business service; and a sending unit, configured to send a query message to a slice selection function entity (SSF), where the query message carries user information of the terminal device, and is used to query for a network slice that is capable of providing a business service for the terminal device, where the receiving unit is further configured to receive slice information, sent by the SSF, of the network slice that is capable of providing the business service required by the terminal device and that is determined based on the user information; and the sending unit is further configured to: after the receiving unit receives the slice information, forward the first request message to the network slice corresponding to the slice information, so that the network slice corresponding to the slice information provides the business service for the terminal device.

In one embodiment, the user information of the terminal device includes at least one of the following information:

an international mobile subscriber identity (IMSI) of the terminal device;

a service type of the terminal device; and an international mobile equipment identity (IMEI) of the terminal device.

In one embodiment, the receiving unit is further configured to: after the sending unit forwards the first request message to the network slice corresponding to the slice information, receive identification information, sent by the network slice, of the network slice; and the sending unit is further configured to send the identification information of the network slice to the terminal device.

In one embodiment, the receiving unit is further configured to: after the sending unit sends the identification information of the network slice to the terminal device, receive a second request message sent by the terminal device, where the second request message carries the identification information of the network slice; and the sending unit is further configured to forward the second request message received by the receiving unit to the network slice corresponding to the identification information of the network slice, so that the network slice corresponding to the identification information provides the business service for the terminal device.

In one embodiment, the slice information includes at least one of the following information:

the identification information of the network slice, a type of the network slice, and address information of the network slice.

According to a fourth aspect, an embodiment of this application further provides a network slice selection apparatus, including:

a receiving unit, configured to receive a query message sent by a core network device, where the query message carries user information of a terminal device, and is used to query for a network slice that provides a business service for the terminal device;

a processing unit, configured to determine, based on a mapping relationship, slice information of the network slice corresponding to the user information of the terminal device, where the mapping relationship is used to describe a correspondence between user information of different terminal devices and slice information of different network slices; and a sending unit, configured to send the slice information determined by the processing unit to the core network device.

In one embodiment, the user information of the terminal device includes at least one of the following information:

an international mobile subscriber identity (IMSI) of the terminal device;

a service type of the terminal device; and an international mobile equipment identity (IMEI) of the terminal device.

Based on a same inventive concept as the foregoing method embodiments, according to a fifth aspect, an embodiment of this application further provides a network slice selection apparatus applied to a core network device, where the apparatus includes:

a communications interface, a processor, and a memory.

The memory is configured to store program code executed by the processor.

The processor receives and sends data by using the communications interface, and is specifically configured to execute the program code stored in the memory, to implement the method in any one of the first aspect or the embodiments of the first aspect.

Based on a same inventive concept as the foregoing method embodiments, according to a sixth aspect, an embodiment of this application further provides a network slice selection apparatus applied to an SSF, where the apparatus includes:

a communications interface, a processor, and a memory.

The memory is configured to store program code executed by the processor.

The processor receives and sends data by using the communications interface, and is specifically configured to execute the program code stored in the memory, to implement the method in any one of the second aspect or the embodiments of the second aspect.

According to a seventh aspect, an embodiment of this application further provides a computer storage medium, where the storage medium stores a software program. When the software program is read and executed by one or more processors, the method provided in any one of the first aspect or the embodiments of the first aspect can be implemented, or the method provided in any one of the second aspect or the embodiments of the second aspect can be implemented.

In the technical solution provided in this application, after receiving the first request message sent by the terminal device, the core network device sends the query message to the SSF, where the query message is used to query for the network slice corresponding to the service required by the terminal device. Therefore, after receiving the slice information, sent by the SSF, of the network slice corresponding to the service required by the terminal device, the core network device forwards the first request message to the network slice corresponding to the slice information, so that the network slice corresponding to the slice information provides the business service for the terminal device. It can be learned from the foregoing that the SSF only needs to connect to the core network device, without a need to connect to each access network device or connect to a plurality of network slices. This reduces signaling transmission and resource occupation.

DESCRIPTION OF EMBODIMENTS

A network slice, namely, a "5G slice", supports a communication service of a specific connection type, and provides processing methods specific to a control plane (CP) and a user plane (UP) for the service. To achieve this objective, a mobile operator configures and manages hundreds or thousands of network slices by configuring and orchestrating a series of network functions on a control platform of a core network (CN), to support a specific case or business model. The network slice may relate to a series of configurations and supports of end-to-end network elements, including devices such as a user equipment (UE) and an access network (RAN) device. The network slice may be used to support a specific application and a specific business model, and provides only necessary service processing and avoids all other unnecessary functions, so as to reduce complexity and shorten a time to market for a service. The network slice allows a third party to control the network slice to some extent, so as to improve flexibility and reduce workload of the operator. The network slice not only includes resource-based network slices, but also provides general network and network element management methods based on slice resources, such as deployment, scale-out/scale-in, and a software upgrade. When a quantity of slices is relatively large, maintenance costs of the operator increase. To reduce the maintenance costs, an autonomous degree of a life cycle management process such as network deployment, scale-out/scale-in, or an upgrade may be improved. In addition, an architecture of sharing a same network is different for a network slice and a conventional mobile virtual network operator (MVNO). A virtualization technology is used for network slices, to isolate different slices based on a resource, and a plurality of different networks are obtained through virtualization according to diversified requirements.

The network slice can be used to implement isolation of network quality of service (QoS), flexible network management and control, and improvement of network efficiency. A network manager can distribute UEs to different slices and map the UEs onto different network subsystems and forwarding devices according to end-to-end QoS requirements, and establish a network slice in a low-cost and high-efficiency manner, without affecting an existing service. The network slice may open some flexible programmable interfaces to a third-party user, so that the third-party user can design and develop a new network service based on the open interfaces and implement fast deployment. This brings significant economic benefits to the operator, and improves utilization of an existing network.

Figure 1:
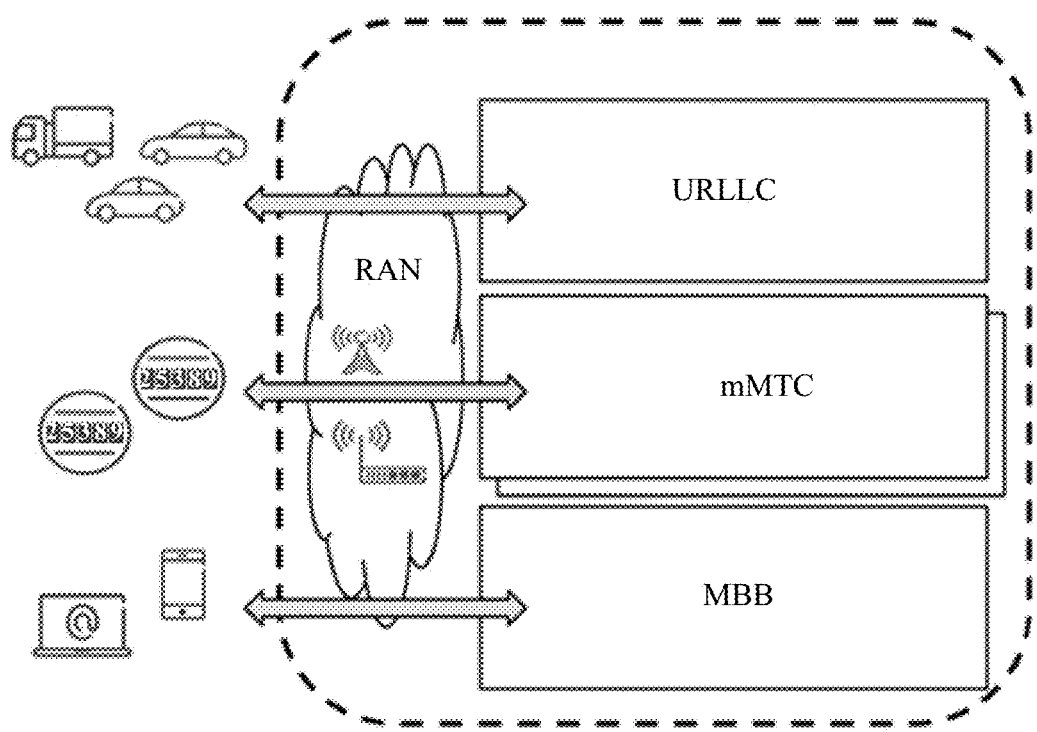
FIG. 1 is an architecture diagram of a network architecture of a network slice that meets different service requirements according to an embodiment of this application.

Currently, the 3$^{rd}$ generation partnership project (3GPP) standard organization summarizes typical scenarios in 5G into the following three types: as shown in FIG. 1, an enhanced mobile broadband (eMBB) service, a massive machine type communications (mMTC) service, and an ultra-reliable and low latency communications (URLLC) service, where the URLLC may also be referred to as a critical machine type communications service. The eMBB is a further improvement of the existing mobile broadband service scenario, on performance such as user experience. The mMTC is mainly applicable to an Internet of Things (IoT) application scenario, and is used to provide a network access service for large-scale Internet of Things terminals that have low power consumption, low costs, and deep coverage. The URLLC is oriented at a scenario that has a strict requirement on reliability and a latency of data transmission, such as a scenario of Internet of Vehicles (IoV) or a scenario of industrial control. The three scenarios include diverse and differential services, and not all future cases require a high rate and wide coverage. Therefore, the 3GPP allows the operator to establish a network slice by using an independent network function set and parameter configuration, to meet requirements of a plurality of operators and a virtual operator. In addition, the 3GPP requires the operator to dynamically generate network slices depending on different market scenarios.

Currently, network slices include the following three types: a completely independent slice, a RAN sharing slice, and a CP sharing slice.

Figure 2A:
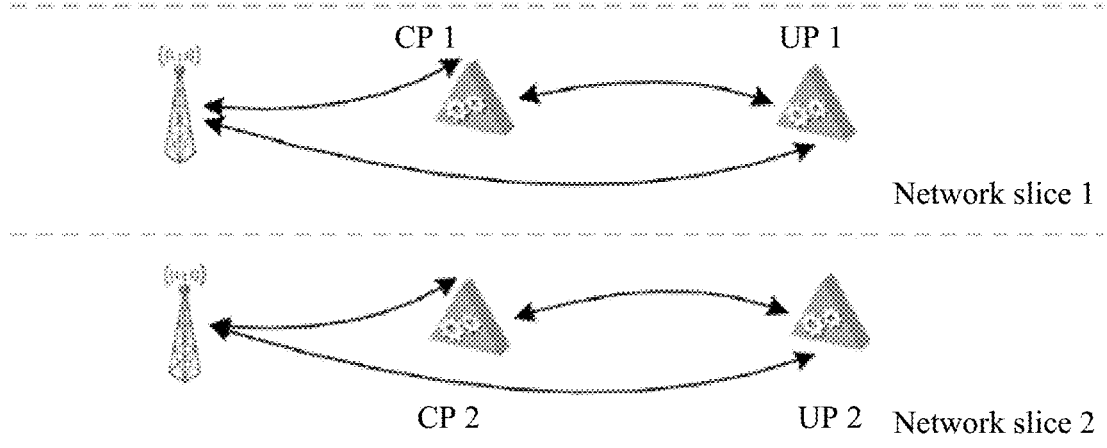
FIG. 2A is an architecture diagram of a completely independent slice according to an embodiment of this application.
Figure 2B:
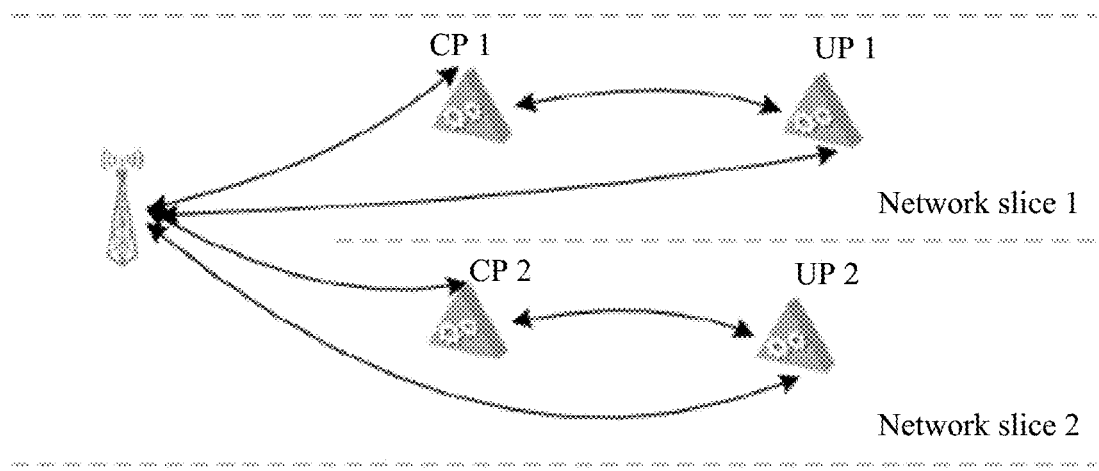
FIG. 2B is an architecture diagram of a RAN sharing slice according to an embodiment of this application.
Figure 2C:
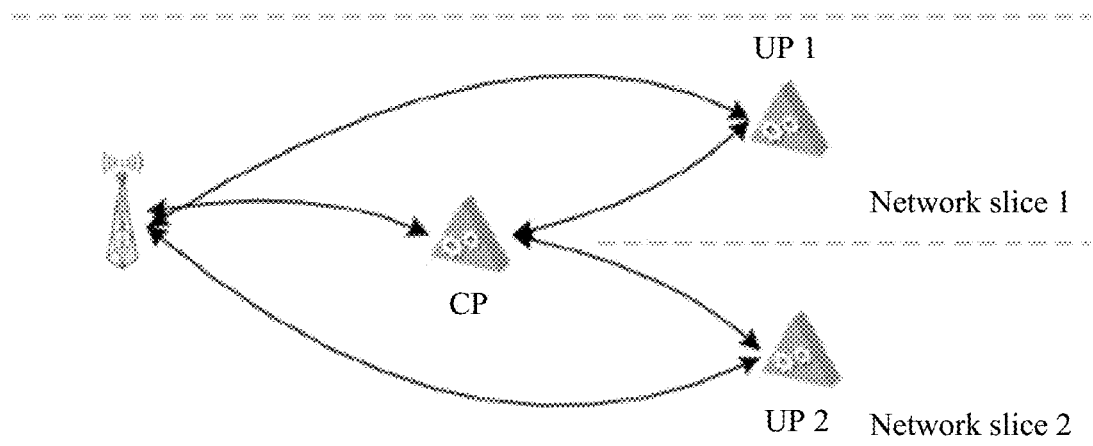
FIG. 2C is an architecture diagram of a control plane (CP) sharing slice according to an embodiment of this application.

FIG. 2A is an architectural diagram of a completely independent slice. The completely independent slice is an end-to-end isolated slice, and an access resource, a CP, and an UP are all exclusive to a user. Such a slice implements complete isolation of data, and is more independent and secure. However, the independent slice also causes waste of resources, and network resources cannot be fully utilized. This is relatively suitable for a network customized for a type of terminal. FIG. 2B is an architecture diagram of a network architecture of a RAN sharing slices. There are no differences between a RAN sharing slices on a RAN side, and RAN sharing improves utilization of a RAN. However, CPs are different in networks, for example, in different networks such as the eMBB and the Internet of Things (IoT). FIG. 2C is an architecture diagram of a network architecture of a CP sharing slice. In the CP sharing slice, a main difference between networks lies in an UP. Different UPs may provide different types of networks, such as a high-latency network and a low-bandwidth network. A CP may be completely or partially shared.

Figure 3:
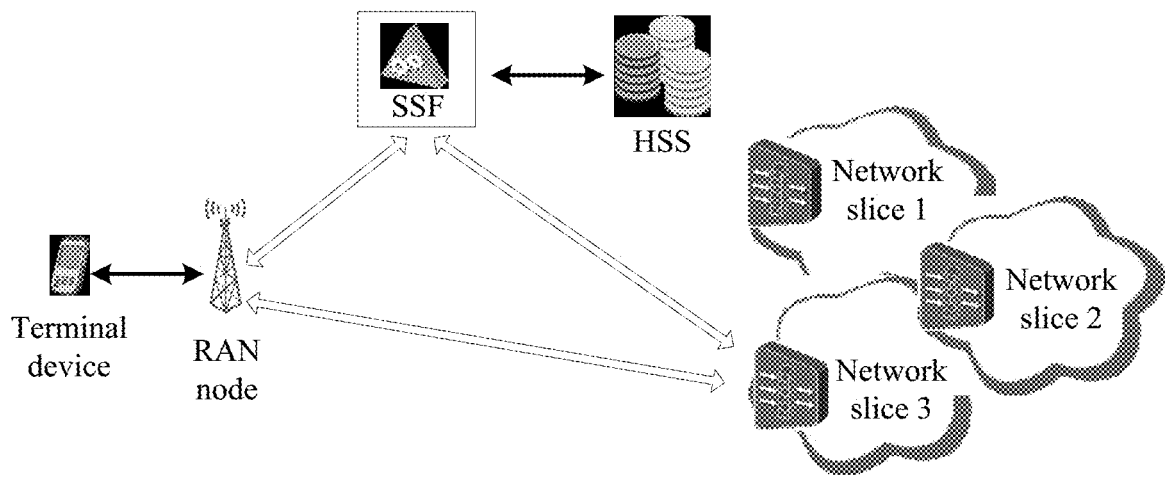
FIG. 3 is a diagram of a network architecture of connecting an SSF to a RAN node according to an embodiment of this application.

FIG. 3 is a diagram of a current possible 5G network architecture. In FIG. 3, a network side includes an independent logical network element SSF, responsible for selecting a network slice for a terminal device and connecting the terminal device to the network slice. After receiving a request from the terminal device, the SSF requests subscription information of the terminal device from a home subscriber service (HSS), and selects a network slice for the terminal device based on the subscription information of the terminal device and a type of a service currently requested by the terminal device. In FIG. 3, a core network may be divided into a plurality of network slices, and each network slice includes a group of network functions having specific functions. A RAN node is connected to the network slices by using the SSF. After connecting to the RAN node, the terminal device selects a suitable network slice by using the SSF, so as to access a data network, thereby forming an end-to-end network slice architecture in 5G It can be learned from the foregoing that the SSF needs to perform network connection to a plurality of RAN nodes, thereby increasing signaling transmission load on the network side.

Based on this, the embodiments of this application provide a network slice selection method and apparatus, to resolve a prior-art problem of relatively large transmission load on a network side. The method and the apparatus are based on the same inventive concept. Because principles of the method and the apparatus for resolving a problem are similar, mutual reference may be made between implementation of the apparatus and implementation of the method, and repeated descriptions are omitted.

The embodiments of this application may be applied to a mobile communications system such as a 5G communications system or a Long Term Evolution (LTE) system.

Figure 4A:
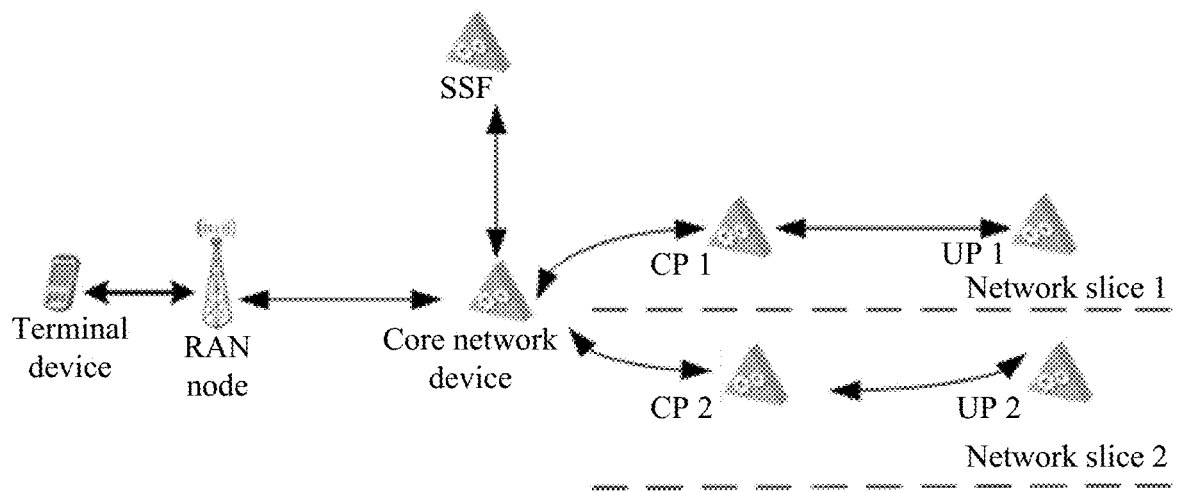
FIG. 4A is a diagram of a network architecture applied to a RAN sharing slice scenario according to an embodiment of this application.
Figure 4B:
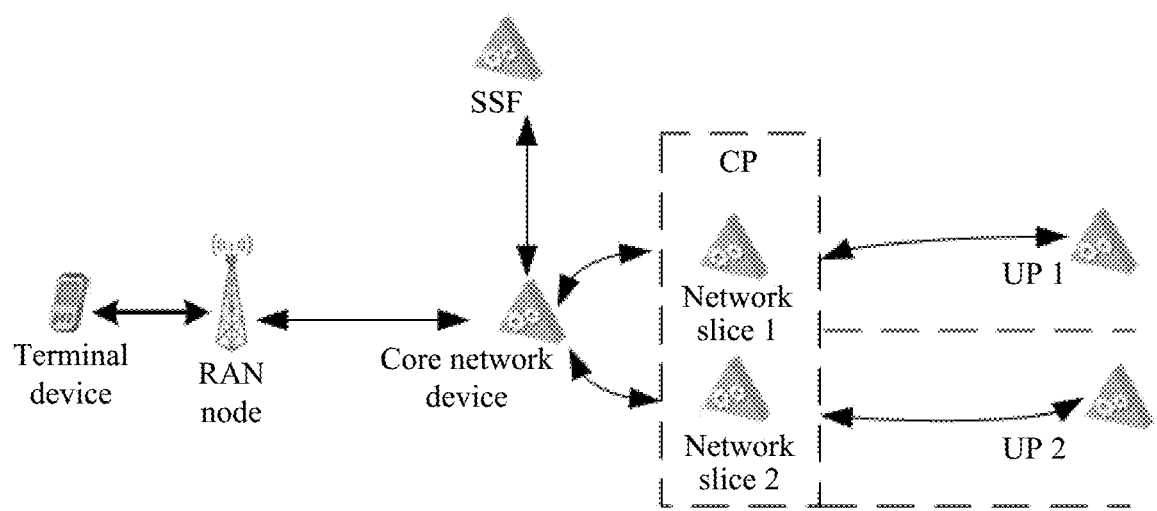
FIG. 4B is a diagram of a network architecture applied to a CP sharing slice scenario according to an embodiment of this application.

FIG. 4A and FIG. 4B are diagrams of network architectures according to an embodiment of this application. A network side includes an independent logical network element SSF, and further includes a core network device. The core network device acts as a unified interface device for connecting to a RAN side, and is connected to the SSF. In addition, the core network device may connect to a network slice used to process a service required by a terminal device. A network slice shown in FIG. 4A is used to provide a processing function according to different service requirements of the terminal device, and the network slice may be customized by a third party, to meet personalized requirements of different applications, such as mobile broadband (MBB) and IoT.

This embodiment of this application may be applied to a CP sharing slice scenario or a RAN sharing slice application scenario.

For the RAN sharing slice application scenario, refer to the diagram of the network architecture shown in FIG. 4A. The network slice shown in FIG. 4A includes a control plane (CP) and a user plane (UP).

For the CP sharing slice application scenario, refer to the diagram of the network architecture shown in FIG. 4B. In FIG. 4B, for a control plane shared architecture, a control plane may be divided into network slices on a plurality of control planes according to service processing requirements of a user, and network slices on different control planes are used to provide different processing functions according to different service processing requirements of the terminal device. After the division, one network slice on the control plane may be in a one-to-one correspondence with a network slice on a user plane. In one embodiment, one network slice on the control plane may alternatively be corresponding to a plurality of network slices on a plurality of user planes. This embodiment of this application imposes no specific limitation herein.

In the embodiments of this application, the core network device may be an independent network element in a core network, and may be specifically implemented by a control plane network element on a control plane in a current mobile communications system, such as a 5G communications system or LTE. For example, the core network device may be implemented by a mobility management entity (MME), a serving gateway (S-GW), or a packet data network gateway (P-GW), or may be implemented by an S-GW control plane or a P-GW control plane. A function of the core network device may alternatively be implemented by a control plane network element formed by converging any network elements of an MME, an S-GW, and a P-GW, or may be implemented by a control plane network element formed by converging an S-GW control plane and a P-GW control plane. In one embodiment, a network element may alternatively be added in a core network of a mobile communications system to implement a function of the core network device. In addition, signaling transmission between the core network device and the RAN side complies with a signaling protocol S1-AP at an application layer.

In the embodiments of this application, the terminal device may be a wireless terminal, for example a mobile phone, a computer, a tablet computer, a personal digital assistant (PDA), a mobile Internet device (MID), a wearable device, an Internet Protocol (IP) phone, a network printer, or an e-book reader.

Figure 5:
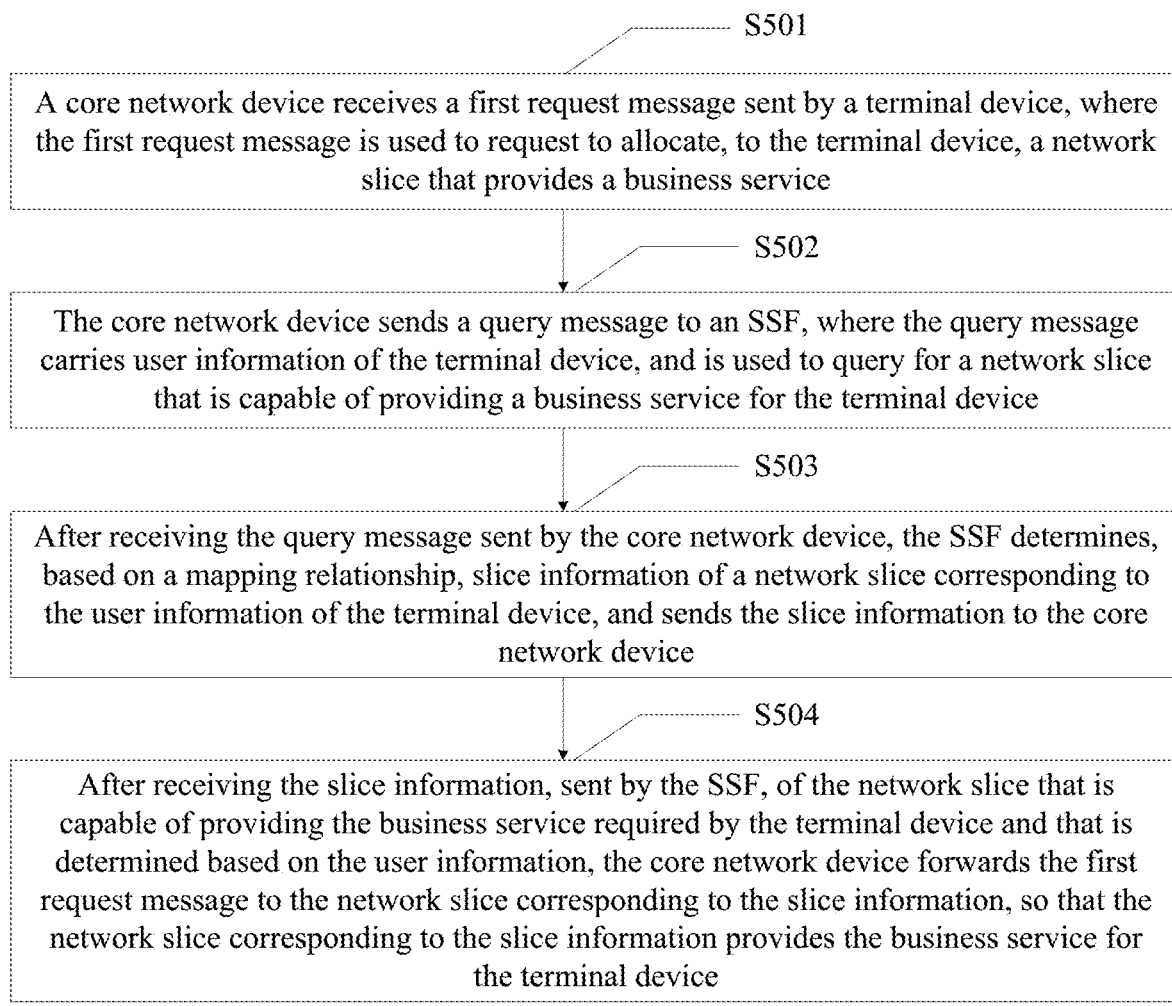
FIG. 5 is a flowchart of a network slice selection method according to an embodiment of this application.

Based on the foregoing descriptions, FIG. 5 is a flowchart of a network slice selection method according to an embodiment of this application.

Referring to FIG. 5, the method includes the following operations.

Operation S501: A core network device receives a first request message sent by a terminal device, where the first request message is used to request to allocate, to the terminal device, a network slice that provides a business service.

The first request message may be an attach request message (an initial attach request), a service request message, or the like.

Operation S502: The core network device sends a query message to an SSF, where the query message carries user information of the terminal device, and is used to query for a network slice that is capable of providing a business service for the terminal device.

Operation S503: After receiving the query message sent by the core network device, the SSF determines, based on a mapping relationship, slice information of a network slice corresponding to the user information of the terminal device, and sends the slice information to the core network device.

The mapping relationship is used to describe a correspondence between user information of different terminal devices and slice information of different network slices.

Operation S504: After receiving the slice information, sent by the SSF, of the network slice that is capable of providing the business service required by the terminal device and that is determined based on the user information, the core network device forwards the first request message to the network slice corresponding to the slice information, so that the network slice corresponding to the slice information provides the business service for the terminal device.

It should be noted that when a network is established, the SSF may obtain a mapping relationship between slice information of a network slice and user information of a terminal device.

Specifically, a manner of obtaining the mapping relationship includes:

sending, by a network platform, the mapping relationship to the SSF;

preconfiguring the mapping relationship on the SSF;

obtaining, by the SSF, the mapping relationship from an HSS; or obtaining, by the SSF, the mapping relationship from a third-party application server.

In this embodiment of this application, the user information of the terminal device includes at least one of the following information:

an international mobile subscriber identity (IMSI) of the terminal device;

a service type of the terminal device; and an international mobile equipment identity (IMEI) of the terminal device.

The following describes the foregoing process by using specific embodiments.

A possible application scenario is that a terminal device initially attaches to a network.

Figure 6:
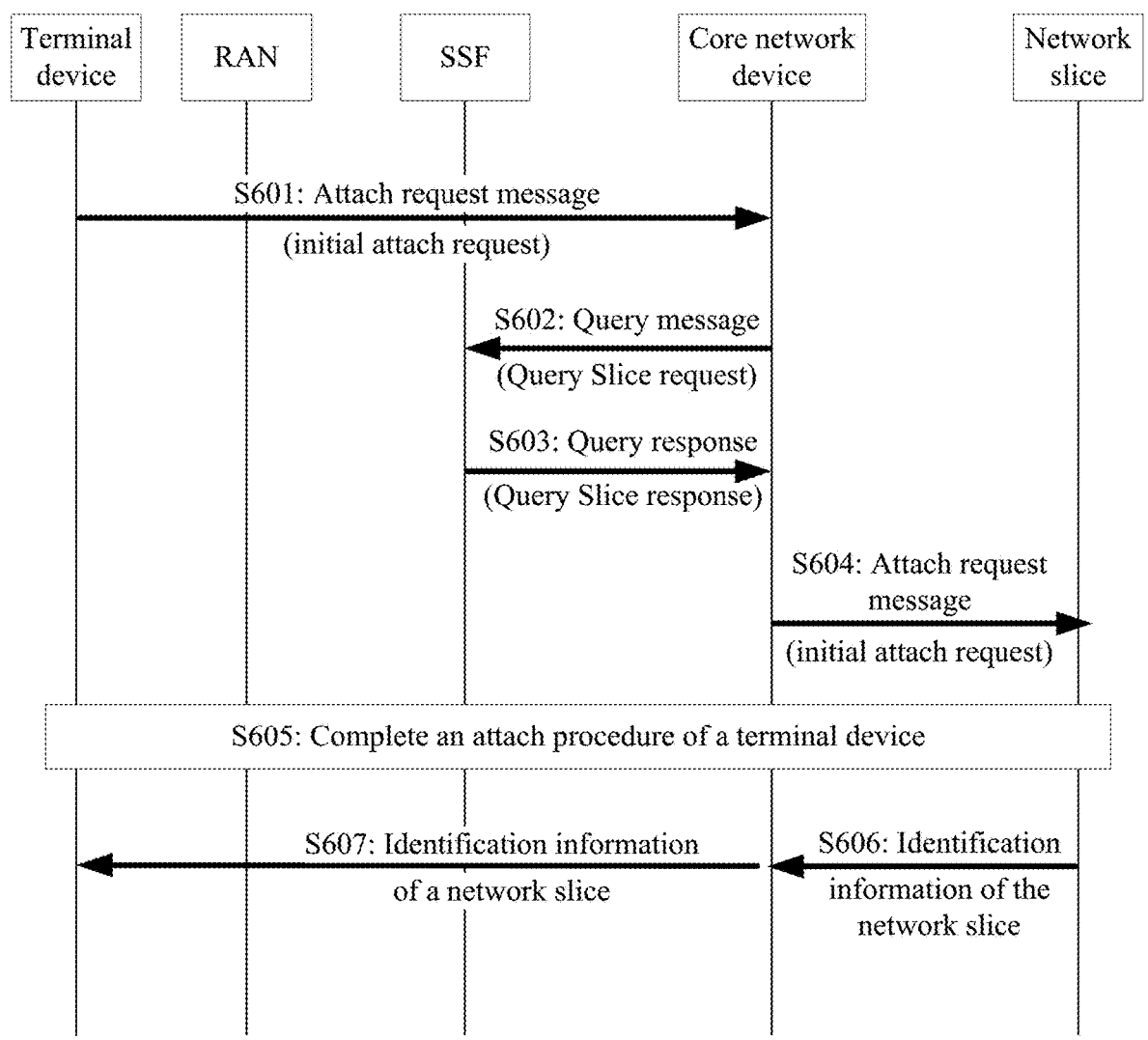
FIG. 6 is a data flow diagram of a network slice selection method in an initial attach scenario of a terminal device according to an embodiment of this application.

FIG. 6 is a data flow diagram of a network slice selection method according to an embodiment of this application.

Data flow S601: A terminal device sends an attach request message (initial attach request) to a core network device. The initial attach request carries user information such as an IMSI and a service type of the terminal device.

Data flow S602: After receiving the initial attach request sent by the terminal device, a core network device sends a query message to an SSF.

The query message may be a query slice request. The query message may include the user information such as the IMSI and the service type of the terminal device.

Specifically, the user information may be the IMSI, the service type, or the IMSI and the service type, or may be an IMEI, or the like.

Data flow S603: The SSF selects a network slice for the terminal device based on the user information, and sends slice information of the selected network slice to the core network device.

The slice information of the network slice may be carried in a query response and sent to the core network device, as shown in FIG. 6.

The query response message may be specifically a query slice response.

Data flow S604: After receiving the query slice response, the core network device sends the initial attach request of the terminal device to the network slice corresponding to the slice information.

The slice information of the network slice may include at least one of the following information:

identification information of the network slice, a type of the network slice, and address information of the network slice.

Data flow S605: The network slice corresponding to the slice information completes an attach procedure of the terminal device.

Data flow S606: The network slice corresponding to the slice information sends identification information of the network slice to the core network device.

Data flow S607: After receiving the identification information of the network slice, the core network device sends the identification information of the network slice to the terminal device. Therefore, when the terminal device requests a same service again, the identification information of the network slice may be carried in a request message and sent to the core network device, so that the core network device no longer needs to query the SSF, and signaling transmission is reduced.

Another possible application scenario is that a terminal device requests a service again.

Figure 7:
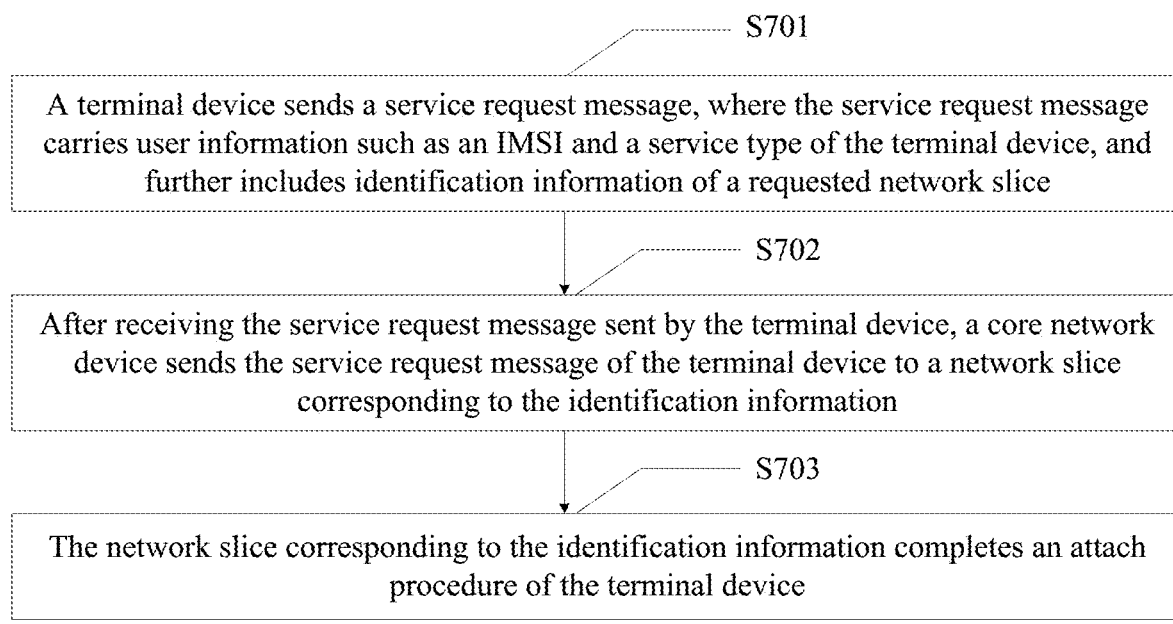
FIG. 7 is a flowchart of a network slice selection method in a re-attach or service request scenario of a terminal device according to an embodiment of this application.

FIG. 7 is a flowchart of a network slice selection method according to an embodiment of this application.

Operation S701: A terminal device sends a service request message, where the service request message carries user information such as an IMSI and a service type of the terminal device, and further includes identification information of a requested network slice.

Operation S702: After receiving the service request message sent by the terminal device, a core network device sends the service request message of the terminal device to a network slice corresponding to the identification information.

Operation S703: The network slice corresponding to the identification information completes an attach procedure of the terminal device.

With reference to a specific application scenario, the following describes the technical solutions provided in the embodiments of this application in detail.

Figure 8:
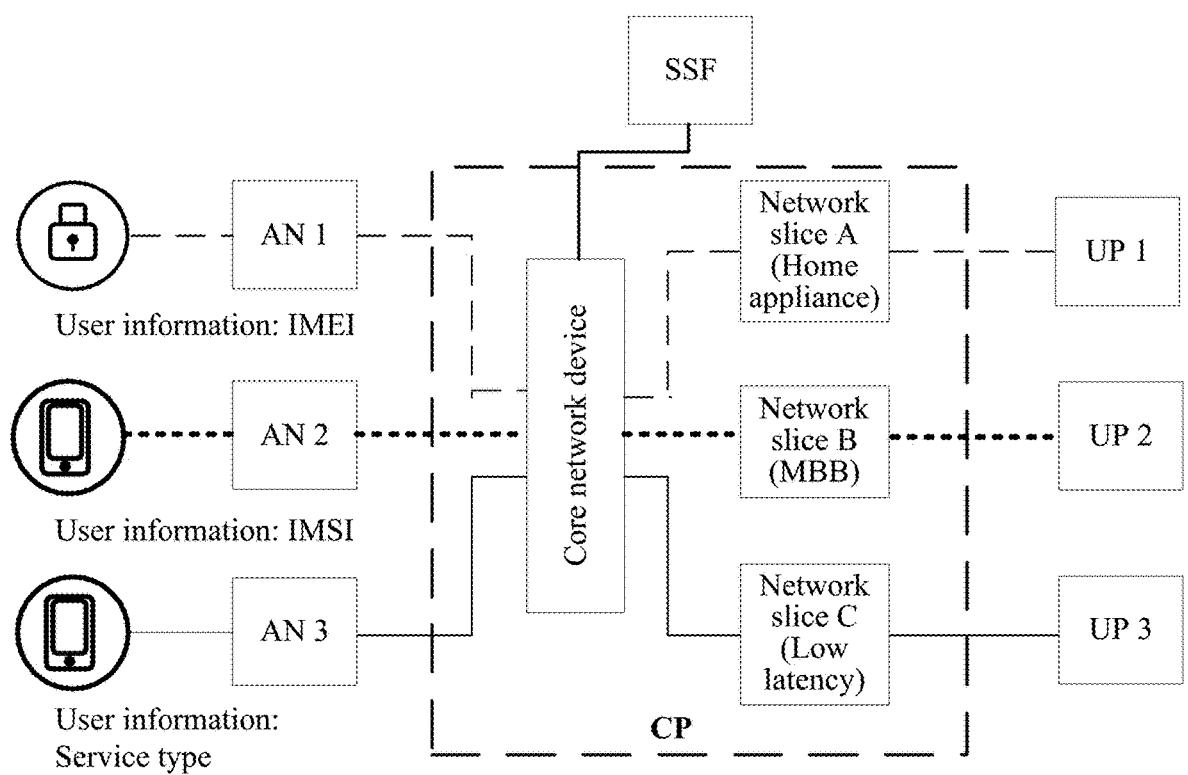
FIG. 8 is a diagram of a network architecture according to an embodiment of this application.

FIG. 8 is a diagram of a network architecture according to an embodiment of this application. The network architecture is specific to a CP sharing slice application scenario. The network architecture includes three intelligent terminal devices: an intelligent lock, a mobile terminal 1, and a mobile terminal 2; and three access network nodes: an AN 1, an AN 2, and an AN 3. The three access network (AN) nodes separately connect to a core network device, and the core network device separately connects to three different network slices. The three different network slices are a network slice A, a network slice B, and a network slice C. The network slice A is used to provide service processing for a service requirement of a home appliance, the network slice B is used to provide service processing for an MBB service, and the network slice C is used to provide service processing for a low-latency service. In addition, the core network device is connected to an SSF. In this embodiment of this application, an example in which user information of the intelligent lock is an IMEI is used for description.

After the core network device receives a request message sent by the intelligent lock, if the request message does not include information about a slice to which the intelligent lock previously attached, the core network device sends a query message to the SSF, where the query message carries the IMEI of the intelligent lock. Therefore, after the SSF receives the IMEI of the intelligent lock, the SSF finds the network slice A through matching based on the IMEI, and sends a query response to the core network device, where a query response message carries slice information of the network slice A. After receiving the query response from the SSF, the core network device sends the request message of the intelligent lock to the network slice A. The network slice A sends a slice ID of the network slice A to the intelligent lock, and the slice ID of the network slice A is specifically forwarded by the core network device and the AN 1 to the intelligent lock. When the intelligent lock requests a service next time, the slice ID may be carried in a request message and sent to the core network device, so that the core network device directly selects the network slice A for the intelligent lock.

For an intelligent terminal, such as a mobile phone, when a user of the intelligent terminal uses different applications, there are different service types when requests are initiated. Therefore, the SSF may select different network slices for the intelligent terminal based on different service types carried in the requests of the intelligent terminal. For a specific procedure, refer to an intelligent lock procedure, and details are not described herein.

In this embodiment of this application, the core network device used to select a slice only needs to be added between a CP and the SSF, and a plurality of ANs no longer need to connect to the SSF. The SSF no longer needs to connect to a plurality of network slices, and only needs to connect to the core network device. This reduces signaling transmission, and reduces occupation of resources on the SSF.

Figure 9:
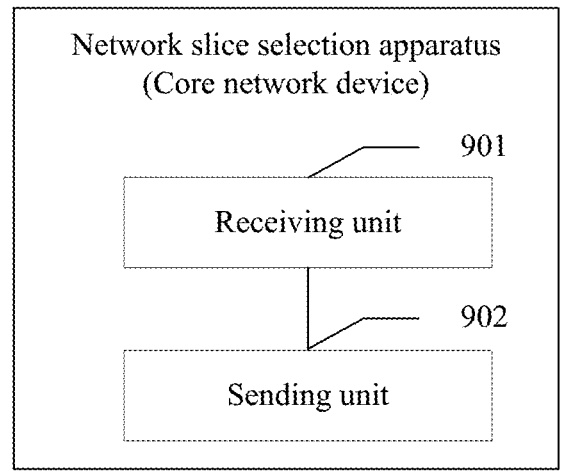
FIG. 9 is a block diagram of a network slice selection apparatus applied to a core network device according to an embodiment of this application.

Based on a same inventive concept as the method embodiments, an embodiment of this application provides a network slice selection apparatus, and the selection apparatus is applied to the core network device. Referring to FIG. 9, the apparatus includes:

a receiving unit 901, configured to receive a first request message sent by a terminal device, where the first request message is used to request to allocate, to the terminal device, a network slice that provides a business service; and a sending unit 902, configured to send a query message to a slice selection function entity SSF, where the query message carries user information of the terminal device, and is used to query for a network slice that is capable of providing a business service for the terminal device.

The receiving unit 901 is further configured to receive slice information, sent by the SSF, of the network slice that is capable of providing the business service required by the terminal device and that is determined based on the user information.

The sending unit 902 is further configured to: after the receiving unit 901 receives the slice information, forward the first request message to the network slice corresponding to the slice information, so that the network slice corresponding to the slice information provides the business service for the terminal device.

In one embodiment, the user information of the terminal device includes at least one of the following information:
an international mobile subscriber identity (IMSI) of the terminal device;
a service type of the terminal device; and
an international mobile equipment identity (IMEI) of the terminal device.

In one embodiment, the receiving unit 901 is further configured to: after the sending unit 902 forwards the first request message to the network slice corresponding to the slice information, receive identification information, sent by the network slice, of the network slice.

The sending unit 902 is further configured to send the identification information of the network slice to the terminal device.

In one embodiment, the receiving unit 901 is further configured to: after the sending unit 902 sends the identification information of the network slice to the terminal device, receive a second request message sent by the terminal device, where the second request message carries the identification information of the network slice.

The sending unit 902 is further configured to forward the second request message received by the receiving unit 901 to the network slice corresponding to the identification information of the network slice, so that the network slice corresponding to the identification information provides the business service for the terminal device.

In one embodiment, the slice information includes at least one of the following information:
the identification information of the network slice, a type of the network slice, and address information of the network slice.

In this embodiment of this application, the division of the network slice selection apparatus into the receiving unit 901 and the sending unit 902 is just an example. This division is merely a logical function division and other types of divisions are possible in actual implementation. In addition, the functional units in this embodiment of this application may be integrated into one processor, or each of the units may exist alone physically, or two or more units may be integrated into one unit. The integrated unit may be implemented in a form of hardware, or may be implemented in a form of a software functional unit.

Figure 10:
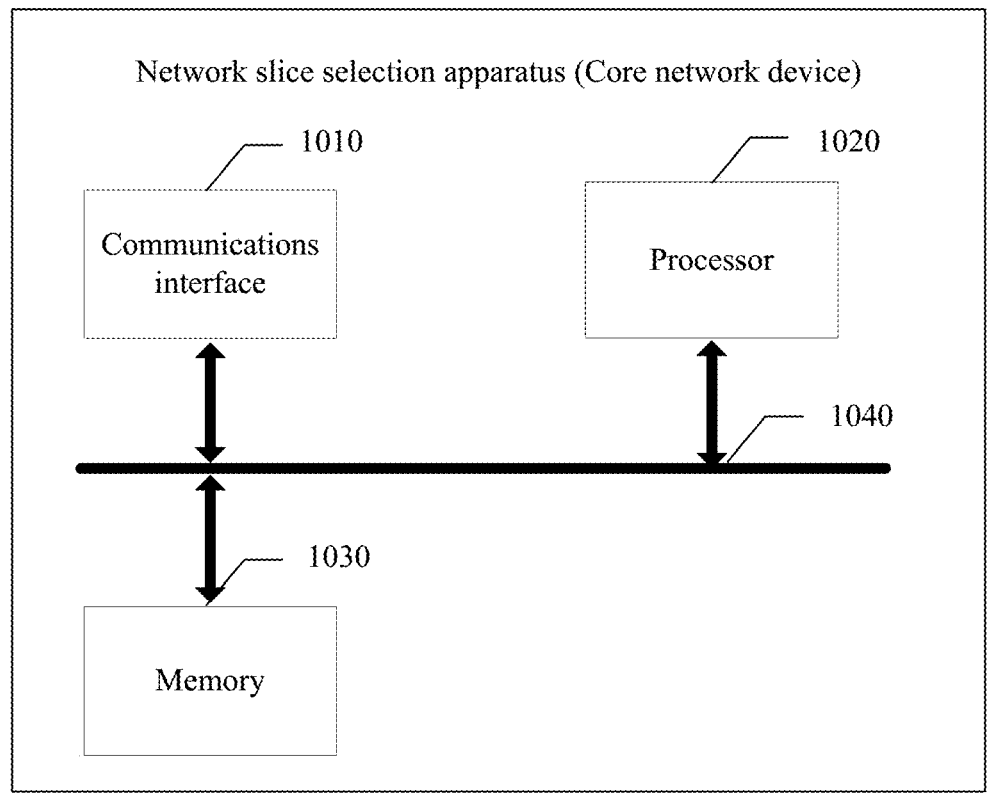
FIG. 10 is a block diagram of another network slice selection apparatus applied to a core network device according to an embodiment of this application.

As shown in FIG. 10, a network slice selection apparatus applied to a core network device may include a communications interface 1010, a processor 1020, and a memory 1030. Physical hardware corresponding to the units shown in FIG. 9 may be the processor 1020. The processor 1020 receives/sends data by using the communications interface 1010, and is configured to implement the method performed by the core network device in FIG. 5 to FIG. 7. In an implementation process, operations of a processing procedure may be performed by an integrated logic circuit of hardware of the processor 1020, or by a software instruction. The processor 1020 may be a general-purpose processor, a digital signal processor, an application-specific integrated circuit, a field programmable gate array or another programmable logic device, a discrete gate or transistor logic device, or a discrete hardware component, and may implement or execute the methods, operations, and logical block diagrams disclosed in the embodiments of this application. The general-purpose processor may be a microprocessor, any conventional processor, or the like. The operations of the methods disclosed with reference to the embodiments of this application may be directly performed by a hardware processor, or may be performed by a combination of hardware in the processor and a software unit. Program code executed by the processor 1020 to implement the foregoing methods may be stored in the memory 1030. The memory 1030 may be a nonvolatile memory, for example, a hard disk drive (HDD) or a solid-state drive (SSD); or may be a volatile memory, for example, a random-access memory (RAM). The memory 1030 is any other medium that can be configured to carry or store expected program code in a form of an instruction or a data structure and that is accessible to a computer, but is not limited thereto.

This embodiment of this application does not limit a specific connection medium between the communications interface 1010, the processor 1020, and the memory 1030. In this embodiment of this application, in FIG. 10, the memory 1030, the processor 1020, and the communications interface 1010 are connected by using a bus 1040, where the bus is represented by a bold line in FIG. 10. This is only a schematic illustration and is not intended as a limitation. There may be other connection topologies between the components. The bus may be classified into an address bus, a data bus, a control bus, and the like. For ease of representation, only one bold line is used to represent the bus in FIG. 10, but this does not mean that there is only one bus or only one type of bus.

Figure 11:
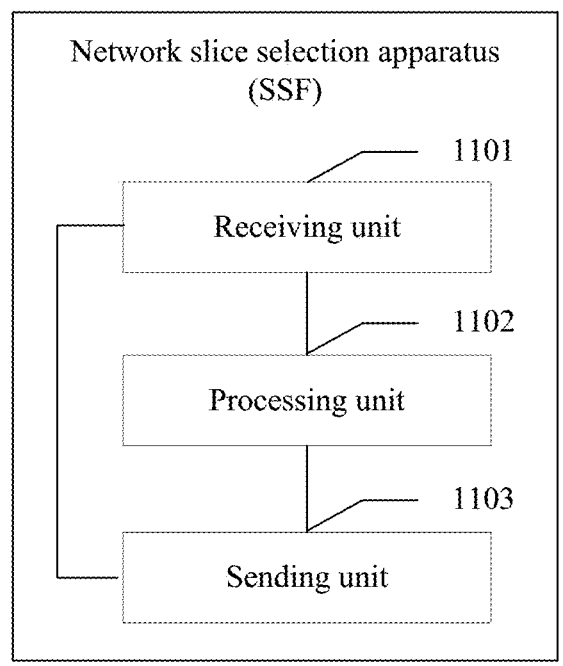
FIG. 11 is a block diagram of a network slice selection apparatus applied to an SSF according to an embodiment of this application.

An embodiment of this application further provides a network slice selection apparatus, and the selection apparatus is applied to an SSF. Referring to FIG. 11, the apparatus includes:
a receiving unit 1101, configured to receive a query message sent by a core network device, where the query message carries user information of a terminal device, and is used to query for a network slice that provides a business service for the terminal device;
a processing unit 1102, configured to determine, based on a mapping relationship, slice information of the network slice corresponding to the user information of the terminal device, where the mapping relationship is used to describe a correspondence between user information of different terminal devices and slice information of different network slices; and
a sending unit 1103, configured to send the slice information determined by the processing unit 1102 to the core network device.

In one embodiment, the user information of the terminal device includes at least one of the following information:
an international mobile subscriber identity (IMSI) of the terminal device;
a service type of the terminal device; and
an international mobile equipment identity (IMEI) of the terminal device.

In this embodiment of this application, the division of the network slice selection apparatus into the receiving unit 1101, the processing unit 1102, and the sending unit 1103 is just an example. This division is merely a logical function division and other types of divisions may be possible in actual implementation. In addition, the functional units in this embodiment of this application may be integrated into one processor, or each of the units may exist alone physically, or two or more units may be integrated into one unit. The integrated unit may be implemented in a form of hardware, or may be implemented in a form of a software functional unit.

Figure 12:
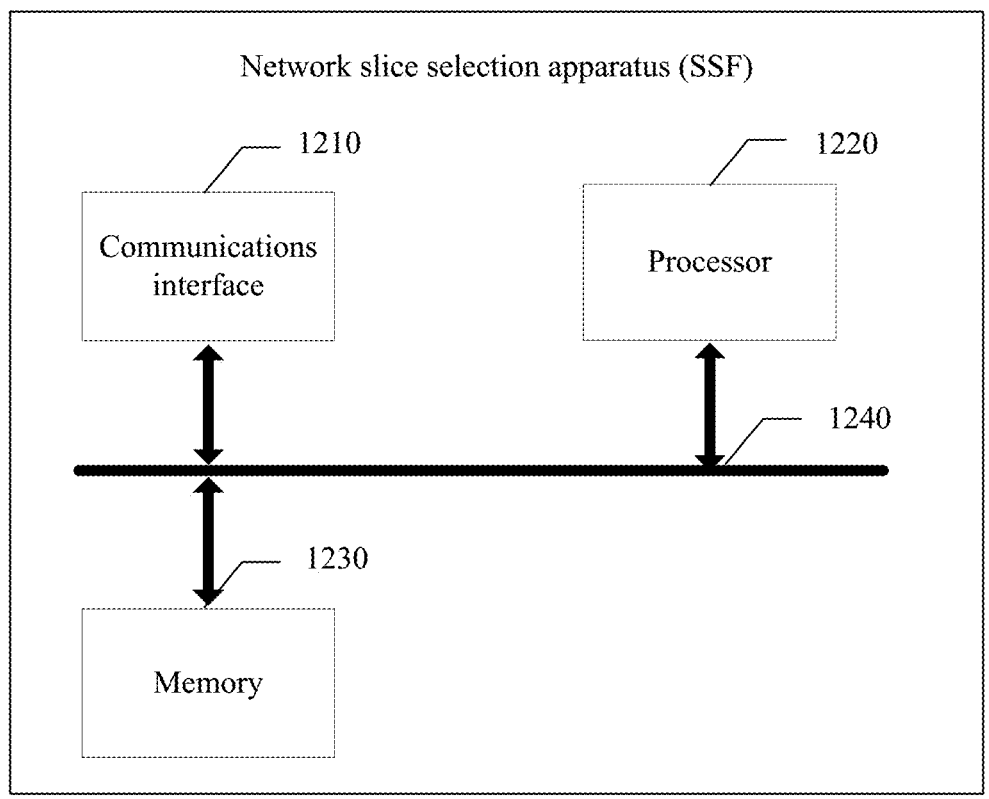
FIG. 12 is a block diagram of another network slice selection apparatus applied to an SSF according to an embodiment of this application.

As shown in FIG. 12, a network slice selection apparatus applied to an SSF may include a communications interface 1210, a processor 1220, and a memory 1230. Physical hardware corresponding to the units shown in FIG. 11 may be the processor 1220. The processor 1220 receives/sends data by using the communications interface 1210, and is configured to implement the method performed by the SSF in FIG. 5 to FIG. 7. In an implementation process, operations of a processing procedure may be performed by an integrated logic circuit of hardware of the processor 1220, or by a software instruction. The processor 1220 may be a general-purpose processor, a digital signal processor, an application-specific integrated circuit, a field programmable gate array or another programmable logic device, a discrete gate or transistor logic device, or a discrete hardware component, and may implement or execute the methods, operations, and logical block diagrams disclosed in the embodiments of this application. The general-purpose processor may be a microprocessor, any conventional processor, or the like. The operations of the methods disclosed with reference to the embodiments of this application may be directly performed by a hardware processor, or may be performed by a combination of hardware in the processor and a software unit. Program code executed by the processor 1220 to implement the foregoing methods may be stored in the memory 1230. The memory 1230 may be a nonvolatile memory, for example, an HDD or an SSD; or may be a volatile memory, for example, a RAM. The memory 1230 is any other medium that can be configured to carry or store expected program code in a form of an instruction or a data structure and that is accessible to a computer, but is not limited thereto.

This embodiment of this application does not limit a specific connection medium between the communications interface 1210, the processor 1220, and the memory 1230. In this embodiment of this application, in FIG. 12, the memory 1230, the processor 1220, and communications interface 1210 are connected by using a bus 1240, where the bus is represented by a bold line in FIG. 12. This is only a schematic illustration and is not intended as a limitation. There may be other connection topologies between the components. The bus may be classified into an address bus, a data bus, a control bus, and the like. For ease of representation, only one bold line is used to represent the bus in FIG. 12, but this does not mean that there is only one bus or only one type of bus.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the other programmable devices provide operation for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A network slice selection method, comprising:
receiving, by a core network device, a first request message from a terminal device, wherein the first request message comprises a service type for requesting to allocate, to the terminal device, a network slice that provides a business service;
sending, by the core network device, a query message to a slice selection function entity (SSF), wherein the query message carries the service type, and wherein the query message is used to query for a network slice that is capable of providing the business service for the terminal device;
receiving, by the core network device from the SSF, slice information of the network slice that is capable of providing the business service required by the terminal device, wherein the network slice is determined based on the service type comprised in the first request message; and
forwarding, by the core network device, the first request message to the network slice corresponding to the slice information.

2. The method according to claim 1, wherein the query message further comprises at least one of:
an international mobile subscriber identity (IMSI) of the terminal device; or
an international mobile equipment identity (IMEI) of the terminal device.

3. The method according to claim 1, wherein after the forwarding, by the core network device, the first request message to the network slice corresponding to the slice information, the method further comprises:
receiving, by the core network device, identification information, sent by the network slice, of the network slice; and
sending, by the core network device, the identification information of the network slice to the terminal device.

4. The method according to claim 3, wherein after the sending, by the core network device, the identification information of the network slice to the terminal device, the method further comprises:
receiving, by the core network device, a second request message from the terminal device, wherein the second request message carries the identification information of the network slice; and
forwarding, by the core network device, the second request message to the network slice corresponding to the identification information of the network slice, so that the network slice corresponding to the identification information provides the business service for the terminal device.

5. The method according to claim 1, wherein the slice information comprises at least one of:
an identification information of the network slice, a type of the network slice, or address information of the network slice.

6. The method according to claim 1, wherein after the forwarding, by the core network device, the first request message to the network slice corresponding to the slice information, the method further comprises:
receiving, by the core network device, identification information, sent by the network slice, of the network slice; and
storing, by the core network device, a correspondence between the terminal device and the identification information of the network slice.

7. The method according to claim 6, further comprising:
receiving, by the core network device, a third request message from the terminal device, wherein the third request message is used to request to allocate, to the terminal device, a network slice that provides a second business service;
determining, by the core network device, based on the correspondence, the network slice corresponding to the second business service requested by the terminal device; and
forwarding, by the core network device, the third request message to the network slice corresponding to the second business service requested by the terminal device.

8. A network slice selection apparatus, comprising at least one processor of a core network device; and a memory configured to store computer readable instructions that, when executed by the at least one processor, cause the at least one processor to:
receive a first request message from a terminal device, wherein the first request message comprises a service type for requesting to allocate, to the terminal device, a network slice that provides a business service;
send a query message to a slice selection function entity (SSF), wherein the query message carries the service type, and wherein the query message is used to query for a network slice that is capable of providing the business service for the terminal device;
receive from the SSF slice information of the network slice that is capable of providing the business service required by the terminal device, wherein the network slice is determined based on the service type comprised in the first request message; and
forward the first request message to the network slice corresponding to the slice information.

9. The apparatus according to claim 8, wherein the query message further comprises at least one of:

an international mobile subscriber identity (IMSI) of the terminal device; or
an international mobile equipment identity (IMEI) of the terminal device.

10. The apparatus according to claim 8, wherein the computer readable instructions when executed by the at least one processor further cause the at least one processor to:
receive identification information, sent by the network slice, of the network slice after the at least one processor forwards the first request message to the network slice corresponding to the slice information; and
send the identification information of the network slice to the terminal device.

11. The apparatus according to claim 10, wherein the computer readable instructions when executed by the at least one processor further cause the at least one processor to:
receive a second request message from the terminal device, wherein the second request message carries the identification information of the network slice after the at least one processor sends the identification information of the network slice to the terminal device; and
forward the second request message to the network slice corresponding to the identification information of the network slice, so that the network slice corresponding to the identification information provides the business service for the terminal device.

12. The apparatus according to claim 8, wherein the slice information comprises at least one of:
an identification information of the network slice, a type of the network slice, or address information of the network slice.

13. The apparatus according to claim 8, wherein the computer readable instructions when executed by the at least one processor further cause the at least one processor to:
receive from the network slice identification information of the network slice after the at least one processor forwards the first request message to the network slice; and
store a correspondence between the terminal device and the identification information of the network slice.

14. The apparatus according to claim 13, wherein the computer readable instructions when executed by the at least one processor further cause the at least one processor to:
receive a third request message from the terminal device, wherein the third request message is used to request to allocate, to the terminal device, a network slice that provides a second business service;
determine, based on the correspondence, the network slice corresponding to the second business service requested by the terminal device; and
forward the third request message to the network slice corresponding to the second business service requested by the terminal device.

15. A network slice selection system, comprising:
a core network device; and
a slice selection function entity (SSF),
wherein the core network device is configured to:
receive a first request message from a terminal device, wherein the first request message comprises a service type for requesting to allocate, to the terminal device, a network slice that provides a business service; and
send a query message to the SSF, wherein the query message carries the service type, and wherein the query message is used to query for a network slice that is capable of providing a business service for the terminal device, wherein the SSF is configured to:
  receive the query message from the core network device; and
  send to the core network device slice information of the network slice that is capable of providing the business service required by the terminal device, wherein the network slice is determined based on the service type comprised in the first request message,
wherein the core network device is further configured to:
  forward the first request message to the network slice corresponding to the slice information.

16. The system according to claim 15, wherein the SSF is further configured to:
  determine, based on a mapping relationship, the slice information of the network slice corresponding to the service type, wherein the network slice is capable of providing the business service required by the terminal, and wherein the mapping relationship is used to describe a correspondence between service types and slice information of different network slices.

17. The system according to claim 15, wherein the query message further comprises at least one of:
  an international mobile subscriber identity (IMSI) of the terminal device; or
  an international mobile equipment identity (IMEI) of the terminal device.

18. The system according to claim 15, wherein the core network device is further configured to:
  receive, from the network slice, identification information of the network slice after the core network device is configured to forward the first request message to the network slice corresponding to the slice information; and
  send the identification information of the network slice to the terminal device.

19. The system according to claim 18, wherein the core network device is further configured to:
  receive a second request message from the terminal device, wherein the second request message carries the identification information of the network slice after the core network device is configured to send the identification information of the network slice to the terminal device; and
  forward the second request message to the network slice corresponding to the identification information of the network slice, so that the network slice corresponding to the identification information provides the business service for the terminal device.

20. The system according to claim 15, wherein the slice information comprises at least one of:
  an identification information of the network slice, a type of the network slice, or address information of the network slice.

* * * * *